UNITED STATES PATENT OFFICE.

OMAR A. STEMPEL, OF CHAMOIS, MISSOURI.

IMPROVEMENT IN PROCESSES OF TREATING PRESERVED EGGS.

Specification forming part of Letters Patent No. 205,313, dated June 25, 1878; application filed October 24, 1877.

*To all whom it may concern:*

Be it known that I, OMAR A. STEMPEL, of Chamois, in the county of Osage and State of Missouri, have invented a new and useful Improvement in Processes of Treating Eggs, which is fully set forth in the following specification.

The object of my invention is to provide a method for treating eggs that have been preserved in a solution, which will obviate their liability to burst upon boiling.

It has heretofore been the case that eggs preserved in solutions of various kinds could not be boiled without the shells cracking. For this reason, eggs that have been thus kept, although perfectly sound and in appearance equal to fresh eggs, always have to be sold a few cents per dozen lower than recently-laid eggs.

My invention consists in the process hereinafter described of treating eggs that have been preserved in solutions.

After the removal of the eggs from the solution in which they have been preserved, a small hole through the shell is pierced in the butt or large end of the egg, where the air-blister is usually found. This hole should not pass through the cuticle enveloping the egg, and which is next to the shell, as that would permit the albumen to escape; and to obviate the liability of puncturing the cuticle the hole should be pierced over the air-blister, which will be found at that point in the shell that has been uppermost. The hole being small is not observable, but is sufficient to allow of the expansion that ensues when the egg is immersed in boiling water, and thus the liability of such eggs to burst their shells in boiling is obviated.

Eggs packed in May and kept until the following winter, if well preserved, will, by the treatment described, bring the same price as recently-laid eggs, because of their non-liability to burst the shell in boiling.

To carry out my process advantageously, a suitable instrument for piercing the shells has been provided, which constitutes the subject-matter of another application now before the Patent Office.

Having described my invention, I claim and desire to secure by Letters Patent—

The process of treating eggs that have been preserved in a solution, consisting of piercing a small hole in the egg-shell over the air-blister, whereby the liability of such eggs to burst their shells in boiling is obviated.

O. A. STEMPEL.

Witnesses:
HENRY MARQUAND,
JACOB SHOBE.